Patented Sept. 9, 1952

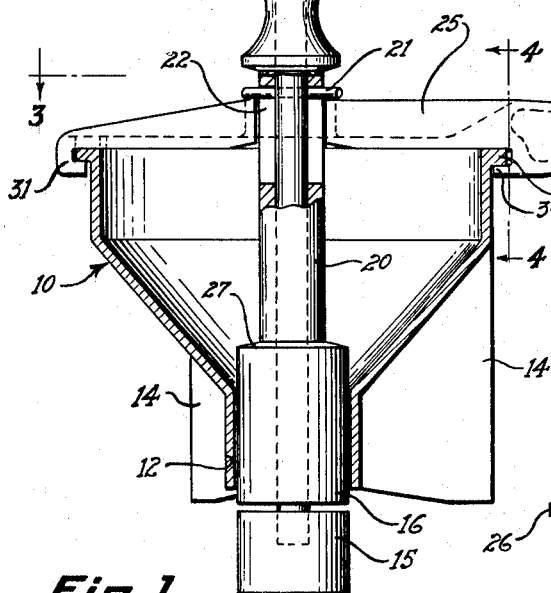
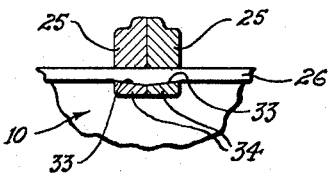
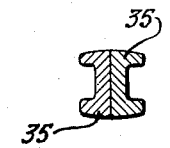
Fig. 4.   Fig. 5.
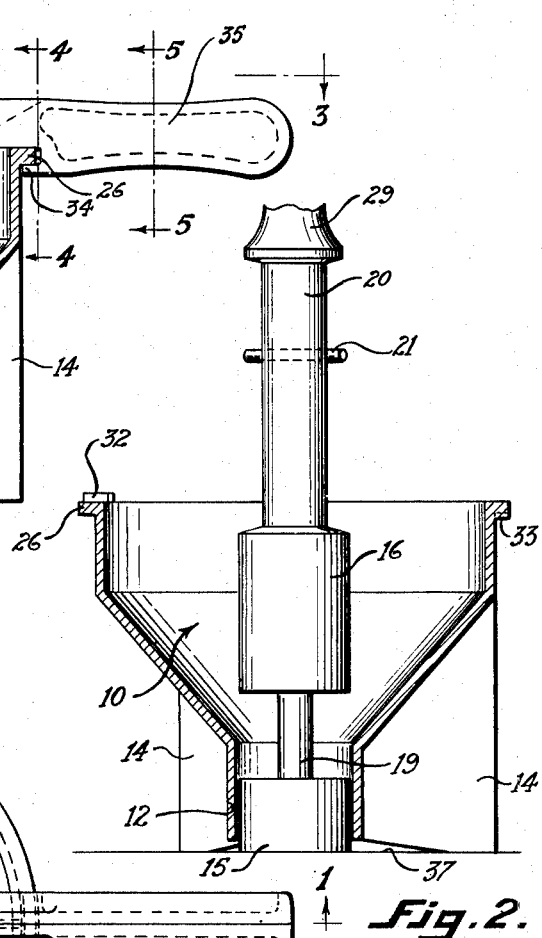
Fig. 1.
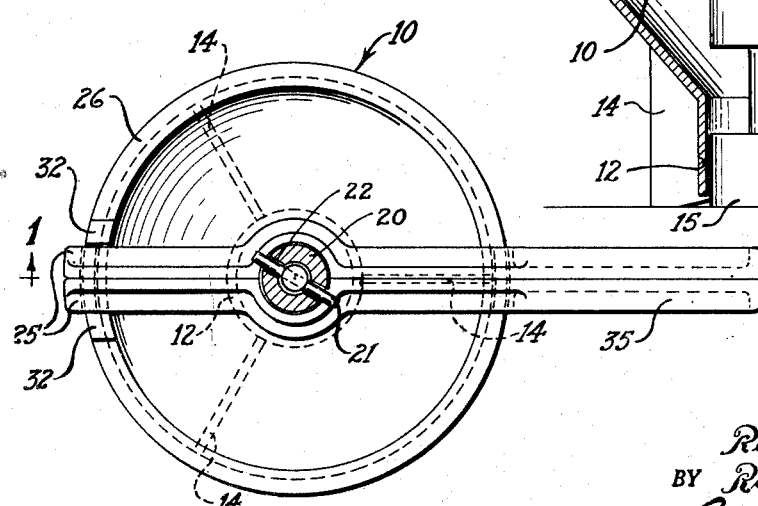
Fig. 3.   Fig. 2.
INVENTORS,
Robert F. Briggs,
BY Raymond J. Moore.

2,609,764

UNITED STATES PATENT OFFICE 2,609,764

PORTABLE BATTER DISPENSER

Robert F. Briggs, Los Angeles, and Raymond J. Moore, Long Beach, Calif., assignors to Eject-O-Lette Mfg. Co., Downey, Calif., a corporation of California Application August 22, 1947, Serial No. 770,064

8 Claims. (Cl. 107—14)

The present invention relates generally to batter dispensers, and more especially to a portable batter dispenser which is particularly adapted for making doughnuts. Although we show and describe herein a form of our invention which is particularly adapted to manual operation for domestic uses, our invention is not necessarily limited thereto.

Making doughnuts by hand by old and well-known methods requires such a lot of labor in mixing and cutting the dough and frying the doughnuts that the housewife does not ordinarily regard this task as being one which can economically be performed at home. In order to lighten the burden and make the home production of doughnuts more attractive, various types of ready-mixed flours are being made available. While much less labor is involved on the part of the housewife with these pre-mixed materials, yet their use almost necessitates special apparatus to handle them because of their consistency, as they produce a batter that is much more fluid than the usual hand-made dough.

In response to this need, there have been devised several different portable batter dispensers which are designed primarily for home use. However, most of these devices have suffered from a multiplicity of parts and complexity of construction which requires a rather larger investment than the average housewife cares to make, and which also defeats their purpose, at least in part, since they are difficult to clean after use.

It is thus a general object of our invention to provide a batter dispenser that is portable and which operates to eject quantities of dough in the proper shape to make doughnuts.

It is also an object of our invention to make a batter dispenser of this character which is extremely simple in construction and operation so that it will have maximum appeal to the practical housewife. Simplicity of construction means a minimum cost as well as maximum ease of cleaning after use. Simplicity of construction also means simple, easy operation and greater uniformity in results, all of which add to the appeal of the device to the prospective purchaser and user.

It is a further object of our invention to make a dispenser which is adapted to receive and dispense a mixed batter which is of a consistency that does not permit of manual handling.

We have achieved these and other objects of our invention by providing, in a portable batter dispenser, a bowl which is adapted to hold a quantity of batter and is provided with a bottom spout for discharge of the batter, and a combined valve and ejector means which operates in conjunction with the spout. The valve is movable from a position within the spout in which it closes the spout, to a position below the spout, at which the spout is open to discharge batter. The ejector is located above the valve and is likewise movable between two positions, a lower position within the spout, and an upper position above the spout in which position batter is free to flow into the spout.

Interengaging members, which preferably take the form of a rod and a sleeve freely slidable on the rod, are attached to the valve and to the ejector respectively and permit free relative movement of the valve and ejector. These interengaging members also serve to move the valve and ejector. Relative motion of the valve and ejector is limited so that the maximum spacing between them is less than the vertical length of the spout. A stationary guide is spaced above the spout in a position to engage one of said interengaging members, preferably the outer sleeve, in order to guide them during their vertical reciprocation. This guide means is formed preferably by a cross bar which spans the open upper end of the bowl and extends beyond at one side to provide a handle by means of which the dispenser may be held above the pan of hot fat in which the doughnuts are fried.

For convenience in holding the dispenser in an upright position when it is at rest, the bowl is provided with a plurality of supporting legs which terminate in a common plane preferably at or spaced below the lower end of the batter discharging spout. The bowl rests upon these legs in a stable position upon a table top or other similar flat surface. The valve member which slides within the spout has a sufficient longitudinal dimension in the direction of this movement so that it can project out of or beyond the spout to come in contact with the table top or similar surface and yet extend upwardly into the spout to seal the bottom of the bowl and prevent discharge of batter. By this arrangement, the dispenser may be set down upon a horizontal surface; and in this position the valve is automatically held in a closed position by engagement with the bowl-supporting surface.

How the above and other objects and advantages of our invention, as well as others not specifically mentioned herein, are attained will be more readily understood by reference to the annexed drawing, in which:

Fig. 1 is a vertical median section through a portable batter dispenser constructed according to my invention, as on line 1—1 of Fig. 3;

Fig. 2 is a view similar to Fig. 1 with the valve and ejector in raised positions, showing the bowl supported on a horizontal surface;

Fig. 3 is a plan view of the batter dispenser with the central rod and sleeve shown in section on line 3—3 of Fig. 1;

Fig. 4 is a fragmentary vertical section on line 4—4 of Fig. 1, showing the engagement of the lugs on the cross bar handle with the lip of the bowl; and Fig. 5 is a vertical section through the handle on line 5—5 of Fig. 1.

There is indicated generally at 10 the bowl for the dispenser. At the bottom of the bowl is a downwardly facing spout 12 through which measured amounts of batter are discharged. The shape of the bowl itself is of no particular importance, but is here shown as having an upper cylindrical portion below which is a conical section which joins the cylindrical spout 12 at its upper end. The bowl is provided with a plurality of supporting legs 14 arranged around spout 12. There are shown here three legs, although a larger number may be used if desired. For simplicity of manufacture, legs 14 are preferably formed integrally with the bowl in the shape of webs which extend downwardly from the bowl. The legs terminate in a common plane which is preferably spaced slightly below the lower end of spout 12; but if desired this plane may be at the end of the spout. The reasons for this construction will become more evident later.

Spout 12 is preferably circular in cross section, and valve 15 has the same cross section. It can slide into and out of the spout. In normal operation, valve 15 is movable between a lower position somewhat below the open lower end of spout 12, as shown in Fig. 1 and an upper position in which all the valve is within the spout, or slightly above the position shown in Fig. 2. Valve 15 thus opens and closes the spout to permit or prevent the discharge of batter therefrom.

The batter dispenser is provided with an ejector member 16 which, like valve 15, is circular in cross section. It is disposed above valve 15 and is movable between a lower position within the spout, shown in Fig. 1, with its lower end projecting beyond the spout, and an upper position above the spout, shown in Fig. 2, in which batter is free to run down into the spout. In order to control flow of batter into the spout, ejector 16 is movable into and out of the upper end of spout 12 in the same general manner that valve 15 is movable into and out of the lower end of the spout.

Both valve 15 and ejector 16 are rigid, plug-like members having a longitudinal or axial dimension which is preferably equal to at least approximately their diameter. The advantages of this construction will be discussed later.

Valve 15 is attached to the lower end of rod 19, while ejector 16 is attached to the lower end of sleeve 20 which is slidably mounted upon rod 19. The rod and sleeve constitute interengaging members attached to the valve and to the ejector which provide for free limited relative movement of the valve and ejector relative to each other, and also for movement of the rod and ejector relative to the bowl. Although any other suitable stop means may be used, it is preferred to pass a stationary pin 21 through the rod, the pin being long enough to project through and beyond slot 22 in the sleeve. By this means, the relative movement of the rod and ejector is limited so that the maximum spacing between the valve and the ejector is less than the length of spout 12. Another result of this pin and slot construction is that when motion of either the sleeve or rod brings the pin into contact with one end of slot 22, continued motion in the same direction causes the valve and ejector members to move together at the same rate.

The stationary guide for sleeve 20 is provided on a cross bar 25 which spans the open upper end of bowl 10 and is removably secured to the bowl by means of lugs which engage the under side of lip 26 which extends around the periphery of the bowl at its upper end. Actually, it is preferable to provide two such cross bars 25 which are similarly but oppositely formed into right and left hand members so that the two cross bars each provide a portion of the guide for the sleeve and together cooperate to provide a complete guide. This guide is in the form of a cylindrical recess in each of the bars so located as to be directly above spout 12 when the cross bars are in place. The two recessed portions are complementary to each other and surround sleeve 20, which slides freely with respect to the cross bar.

As will be noted in Fig. 1, pin 21 is so located in rod 19 as to be above the cross bars, and it engages the upper face of the cross bars to limit downward movement relative thereto of both the sleeve and the rod. Sleeve 20 is provided with stop means in the form of shoulder 27 which engages the under side of cross bars 25 to limit upward movement relative thereto of both the sleeve and rod 19.

The upper end of sleeve 20 is provided with a grip 29 by means of which the sleeve may be grasped for manual reciprocation to effect discharge of batter from the dispenser. Rod 19 extends upwardly through and above grip 29 for a short distance in a position to permit the operator to manually press down upon the end of rod 19 with his thumb in order to separate the valve and ejector under some circumstances, as will be more fully discussed.

As stated above, the bowl is provided around its upper edge with lip 26; and two portions of the lip, which are at diametrically opposite positions on the bowl, are used for attachment of the cross bars. The portions of the lip between these two positions may be omitted if desired. Each cross bar 25 has at one end a hook-shaped lug 31 adapted to engage bowl lip 26 as shown in Fig. 1. In order to keep these ends of the cross bars from moving laterally out of position engaging the bowl lip, the rim of the bowl is provided with a pair of spaced raised bosses 32, as shown in Figs. 2 and 3. These two bosses define between them one of the lip sections for engaging the cross bars.

At a position diametrically opposite from this lip section, there is provided on the under side of lip 26 a pair of short, inclined surfaces 33. Optionally, surfaces 33 may be on the top of lip 26. These two inclined surfaces are inclined oppositely to each other and slope upwardly and outwardly away from each other, when viewed as in Fig. 4. Each surface 33 is adapted to be engaged by a complementary surface on a second hook-shaped lug 34 on a cross bar 35. The cross bar is secured in place on top of the bowl by first engaging lug 31 at the outer end with the bowl lip, and then rotating the bar around this point of engagement in a plane parallel to the top of the bowl, thus sliding lug 34 underneath the bowl lip at the opposite side. Continued movement causes lug 34 to engage the inclined surface 33 which produces a wedging action that holds the bar in place. The two cross bars 25 are brought together in this way from opposite directions and together form, in effect, a single member which provides a guide for the upper end of sleeve 22.

Cross bars 25 preferably extend at one end beyond the bowl in order to provide a handle portion 35 by which the entire batter dispenser can be held above the pan of hot fat while the valve and ejector are operated with the other hand. The frictional engagement of the cross bars with the bowl lip is sufficient to normally hold them together, but this action is of course reinforced by the grasp of the operator, when the dispenser is held in operating position.

Having described the construction of the improved batter dispenser, its operation will now be briefly described. Initially the bowl is placed on a table top or other horizontal surface, as indicated in Fig. 2 at 37, so that it is supported thereon by legs 14 with its open side upward. Valve 15 is inserted in spout 12 from the top; but gravity ordinarily moves ejector 16 down from the position shown in Fig. 2 until it occupies the same position relative to the valve that is shown in Fig. 1. Now the bowl is filled with batter; and this may be done freely without interference from the cross bars 25 since it is not necessary that they be put in place until after the bowl is filled.

It will be noted that while the bowl is resting upon surface 37, that it is held firmly against tipping or tilting by legs 14. Also, valve 15 projects beyond spout 12 a sufficient distance to engage surface 37 and by contact therewith the downward movement of the valve is limited. Yet at the same time, valve 15 remains in spout 12 for a sufficient distance to completely seal the valve against any flow of batter out of the dispenser. This results from the fact that the axial length of valve 75 is in excess of the distance between the bottom of the spout and surface 37 which is the common plane in which legs 14 terminate.

After the bowl is filled, the two cross bars are individually attached as described above, sleeve 20 being received in the two complementary, semi-cylindrical recesses in the cross bars which provide a guide for the sleeve during its vertical reciprocation.

Now that the dispenser is charged with batter and completely assembled, ready for use, it is picked up in one hand by handle 35, while the other hand is used to grasp handle 29 on the sleeve. By pressing downwardly with the thumb on rod 19, ejector 16 is raised relative to valve 15 until the two are separated as shown in Fig. 2. Batter flows into the space between these two members, filling spout 12 above valve 15. The dispenser is now ready for discharge of the first portion of dough.

This is accomplished by simply pressing downwardly upon handle 29. By the combined action of gravity and the movement of ejector 16, batter is moved ahead of the ejector into spout 12. It is not necessary for the operator to apply any force directly to rod 19 to move valve 15, for the descending ejector 16 transmits force through the batter trapped in spout 12 between the ejector and valve 15, to move the latter downwardly.

The operator presses downwardly upon handle 29 and ejector 16 is moved downwardly because of its direct connection to sleeve 20. Valve 15 is moved downwardly ahead of the descending ejector by virtue of a force which is transmitted to the valve through the batter between the valve and the ejector. Under these conditions, the valve and ejector move downwardly together at the same rate until valve 15 reaches the position of Fig. 1, where it is completely below and clear of spout 12. In this position, further downward movement of valve 15 is stopped by engagement of cross pin 21 with the upper edges of cross bars 25, as shown in Fig. 1. The ejector and sleeve 20, however, are free to continue their downward movement, because of pressure applied to handle 29, for the length of slot 22. Downward movement of the ejector is stopped by engagement of the upper end of slot 22 with pin 21 when the ejector has reached the position shown in Fig. 1 in which the ejector is partly within and partly below spout 12. This downward movement of ejector 16 after valve 15 becomes stationary causes the batter held between these two members to be forced outwardly in an annular body which adheres to the outer surface of the valve and to the thin body of batter remaining between the ejector and valve when the ejector has reached the bottom end of its travel. It is now necessary to strip off this annular body of batter by moving the central valve and ejector assembly upward by an upward pull on handle 29. The upward motion brings the ring of batter into engagement with the lower edge of spout 12 which strips off the batter as the ejector and valve move upwardly, and the batter drops into the pan of hot fat over which the dispenser is held.

During the upward stroke, the valve and ejector initially move together because of the adhesive effect of the film of batter remaining between them. However, when the ring of dough reaches the lower edge of spout 12, the valve encounters somewhat greater resistance to movement and there is a tendency for the ejector to pull away from the valve. This separation of the ejector and valve in their upward movement does not take place at any well-defined point, nor does the valve necessarily stop its upward motion while the ejector alone is moved upwardly as a result of the pull on handle 29. Actually, once valve 15 has entered into spout 12 air pressure on its lower face tends to move it upwardly in unison with ejector 16.

Ordinarily ejector 16 becomes sufficiently separated from the valve below it that when the ejector clears the upper end of spout 12, upward movement of valve 15 ceases and the ejector alone continues to move upwardly until the lower end of slot 22 engages pin 21, after which both move upwardly together until shoulder 27 engages the under sides of cross bars 25. During this last part of the upward stroke, the valve and ejector are widely separated, as shown in Fig. 2, and batter flows down into this space between the two members under the influence of gravity and air pressure upon the top of the batter. When the space above the valve has been filled with batter, then the above-described operating cycle can be repeated.

It sometimes happens that the valve and ejector members do not become separated and that the valve travels upwardly with the ejector for the full length of the latter's stroke. When this occurs, the operator merely presses downwardly with his thumb on the upper end of rod 19 where it projects above grip 29, thus separating valve 15 from the ejector and returning it to its normal maximum distance below the ejector so that a normal charge of batter is drawn into the space between the valve and the ejector. This action is analogous to the action of initially separating the two members when the bowl has been freshly charged with batter. It is of course possible to add a stop means or springs which either operate to positively separate the valve and ejector or to limit the upper travel of the valve, but such devices only result in additional complexity of the structure and more parts to clean after use. Consequently, it is preferred to separate the two members manually, when necessary, by pressure upon the upper end of valve rod 19.

It will be noted that the valve and ejector should be of such axial lengths that at least one of these members is always well within spout 12 at either the upper or lower extremes of motion, in order that the spout is securely sealed against accidental discharge of batter. With the doughnut of familiar size and shape, I find that the proper amount of batter is measured out for each stroke if the parts are proportioned approximately as shown with the quantity extruded on each stroke weighing between approximately 1.5 and 2 ounces. It will be noted that under these circumstances the axial or longitudinal dimensions of the valve and ejector are approximately equal at least to their diameter. This permits the valve and ejector to travel out of and beyond spout 12 by the necessary distances while still leaving a substantial portion of the members within the spout to provide the necessary seal. Of course, either of these two members may be longer axially than one diameter, since the maximum longitudinal dimensions are determined by such factors as the height of bowl 10, the length of legs 14, and the length of spout 12.

After use, cleaning the dispenser is made very simple by its construction. The two cross bars 25 are removed from the bowl by reversing the movements used to secure them to the bowl, as described above. Then the valve and ejector assembly is raised upwardly to remove it from the bowl, withdrawing the valve and ejector through the upper end of spout 12. Pin 21 can be pushed out of rod 19, permitting rod 19 to be withdrawn from sleeve 22, thus completely disassembling the valve and ejector assembly. The complete dispenser is now broken down into only six separate individual pieces, all of which may be quickly and easily cleaned, in hot water, and then reassembled to any extent desired for storing the dispenser. No special tools or brushes are needed to keep the dispenser clean.

Having illustrated and described a preferred form of our invention, it will be realized that changes therein may be made by persons skilled in the art without departing from the spirit and scope of our invention; and consequently we wish it understood that the foregoing description is considered as being illustrative of, rather than restrictive upon, the appended claims.

We claim:

1. In a portable batter dispenser, the combination comprising: a bowl adapted to receive and hold a quantity of batter and having a bottom spout for discharge of the batter; a rod having on its lower end a valve movable into and out of the spout to close and open the spout; a sleeve mounted on the rod for free sliding movement and having on its lower end an ejector member movable into and out of the spout; a cross bar extending across the bowl and having a guide portion adapted to guide said sleeve; and means limiting the relative longitudinal movement of the rod and sleeve and engageable with the cross bar to limit the relative downward movement of the rod and sleeve; said sleeve having a shoulder engageable with the cross bar to limit its upward movement and an integrally formed handle portion above the shoulder for manual manipulation of the sleeve; said valve being initially forced downward with and ahead of the descending ejector by the batter trapped in the spout between the valve and ejector.

2. In a portable batter dispenser, the combination comprising: a bowl adapted to receive and hold a quantity of batter and having a bottom spout for discharge of the batter; a valve movable between a position within the spout and a position below the spout; an ejector movable between a position above the spout and a position partly within and partly below the spout; stop means positioned to arrest downward travel of the valve when at a position spaced below the spout; stop means positioned to arrest downward travel of the ejector when the lower end of the ejector is at a position slightly below the spout and slightly above the valve; and means for raising and lowering the ejector, the valve being moved downwardly ahead of the descending ejector by force transmitted through the batter in the spout between the valve and ejector.

3. In a portable batter dispenser, the combination comprising: a bowl adapted to receive and hold a quantity of batter and having a bottom spout for discharge of the batter, the bowl having an external lip at each of two diametrically opposite positions; and a bar adapted to be removably secured in place across the top of the bowl and extending beyond to provide a handle by which the dispenser can be held, the bar having two hook-shaped lugs each engageable with one of the external lips of the bowl.

4. A portable batter dispenser as in claim 3 in which one of the lips of the bowl has an inclined surface engageable by the bar by motion in a plane parallel to the top of the bowl to produce a wedging action that holds the bar in place.

5. A portable batter dispenser as in claim 4 having two such bars and two inclined surfaces on the bowl lip which are oppositely inclined and each engaged by one bar.

6. In a portable batter dispenser, the combination comprising: a bowl adapted to receive and hold a quantity of batter and having a downwardly facing spout for discharge of batter; a valve movable between a position within the spout and a position below the spout; an ejector movable between a position above the spout and a position partly within and partly below the spout; a rod attached to the valve; a sleeve attached to the ejector, said sleeve being slidably mounted on the valve rod and having a grip at its upper end by which it can be grasped for manual reciprocation; means limiting the relative longitudinal sliding movement of the rod and sleeve; and a guide for said sleeve engageable with said limiting means to limit downward motion of the rod and sleeve relative to the spout, said valve rod projecting through and above the grip to permit the operator to press manually on the rod to separate the valve and ejector, and the valve being moved downwardly to its lowermost position ahead of the descending ejector upon manipulation of the latter, by means of the batter trapped in the spout between the valve and the ejector.

7. In a portable batter dispenser, the combination comprising: a bowl adapted to receive and hold a quantity of batter and having a downwardly facing spout for discharge of batter; a valve movable between a position within the spout and a position below the spout; an ejector movable between a position above the spout and a position partly within and partly below the spout; a rod attached to the valve; a sleeve attached to the ejector and slidably mounted on the valve rod; means limiting the relative longitudinal sliding movement of the rod and sleeve; and a pair of rigid bars extending across the top of the bowl and beyond the bowl at one side to provide a handle by which the bowl can be held, the bars having complementary recessed portions forming a guide for the sleeve, engageable with said limiting means to limit downward motion of the rod and sleeve relative to the cross bar and the bars and bowl each having lugs engageable with one another by relative sliding movement to secure the bars to the bowl; said valve being moved downwardly to its lowermost position ahead of the descending ejector upon manipulation of the latter, by means of the batter trapped in the spout between the valve and the ejector.

8. In a portable batter dispenser, the combination comprising: a bowl adapted to receive and hold a quantity of batter and having a bottom spout for discharge of batter; a valve movable longitudinally of the spout between an upper position in which the valve closes the spout and a lower position in which the valve is entirely below the spout; an ejector movable longitudinally of the spout between an upper position wholly above the spout and a lower position in which the bottom of the ejector is adjacent the lower end of the spout; a rod connected at one end to the valve; a sleeve surrounding and slidable relative to the rod, said sleeve being connected at its lower end to the ejector and having a slot extending through it; a transverse pin projecting through the slot in the sleeve and engaging the sleeve at each end of the slot to move the rod and sleeve together but disengaging the sleeve intermediate the ends of the slot to permit free relative movement of the valve and ejector; the length of the slot being sufficient that the ejector enters the spout within the range of its free travel when the valve is in its upper position; and a stationary guide detachably secured to and spanning the upper end of the bowl and engaging the sleeve to guide it during movement, the transverse pin engaging the guide to limit downward travel of the valve and ejector.

ROBERT F. BRIGGS.
RAYMOND J. MOORE.

REFERENCES CITED

The following references are of record in the file of this patent:

UNITED STATES PATENTS

| Number | Name | Date |
|---|---|---|
| 515,571 | Burgess | Feb. 27, 1894 |
| 1,505,602 | Padolsky | Aug. 19, 1924 |
| 1,847,293 | Carpenter | Mar. 1, 1932 |
| 1,968,808 | Carpenter | Aug. 7, 1934 |

FOREIGN PATENTS

| Number | Country | Date |
|---|---|---|
| 6,372/27 | Australia | Mar. 20, 1928 |